United States Patent Office 2,908,897
Patented Oct. 13, 1959

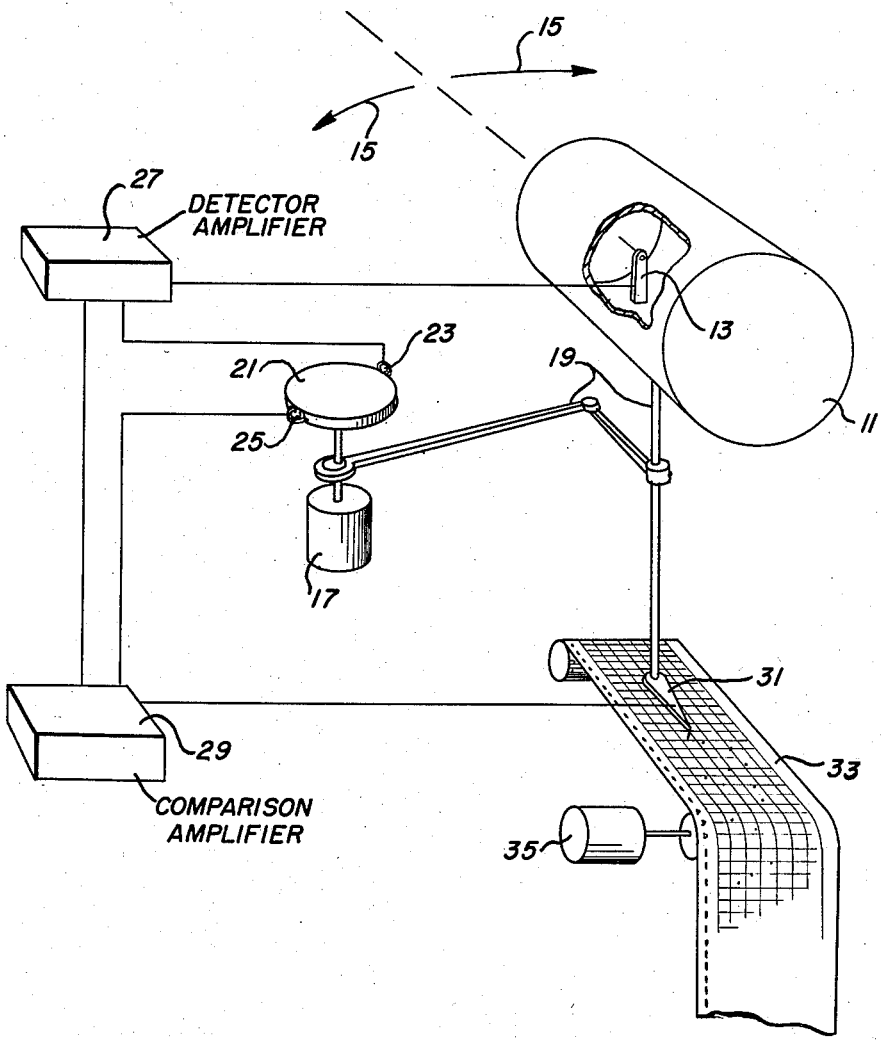

2,908,897

INTRUSION DETECTING SYSTEM

William E. Merriman, Rochester, N.Y., assignor to Eastman Kodak Company, Rochester, N.Y., a corporation of New Jersey Application November 23, 1956, Serial No. 623,997

1 Claim. (Cl. 340—258)

The present invention relates to an intrusion detecting system.

While other applications are possible and will become readily apparent to those skilled in the art from the following description, the detecting system of my invention will be described in conjunction with its application as a wide field intrusion detector. Broadly, the proposed detecting system comprises means for cyclically scanning a predetermined object field, means for recording amplified signals detected during a scanning cycle, means for comparing any amplified signal as it is generated during the current scanning cycle with the signal recorded at the same corresponding point of the preceding scanning cycle, and means for indicating the angular position and time at which a significant difference in level is noted between the compared signals which occurs as a result of the intrusion of a body into the object field.

The primary object of the present invention is, therefore, to provide an intrusion detecting system in which the object field is cyclically scanned and means is provided for responding to and indicating a significant change in the level of a signal generated at a particular point in the scanning cycle as compared to the level of the signal generated at the same corresponding point during a previous scanning cycle which occurs as a result of the intrusion of a body into the object field.

Another object of the present invention is to provide an intrusion detecting system in which the signals generated by the detecting element during a scanning cycle are amplified, recorded and compared with the amplified signals being generated during the current scanning cycle and in which a stylus is actuated in response to a significant difference in level between any two corresponding signals to give a visual indication of the time and position in the field of the intruding body causing the difference in signal level.

Still other objects and advantages will become readily apparent to those skilled in the art from the following description with reference to the drawing in which the principal features and operation of the present invention are schematically illustrated.

As illustrated in the drawing the scanning head 11 including the detecting element 13 is cyclically oscillated in the direction indicated by arrows 15 by a motor 17 through a mechanical linkage designated generally at 19. The amplitude of the cyclic oscillation determines the horizontal dimensions of the object field of the system. The height of the detecting element 13 limits the vertical dimension of the field and the resolution of the system is determined by the width of the detecting element 13. Motor 17 is arranged to simultaneously drive the magnetic recorder 21 through a gear reducer (not shown) having a 2:1 reduction ratio. This permits a complete cycle of oscillation of the scanning head 11 to be recorded on the drum of the recorder 21 between the recording head 23 and the pick up head 25 which are positioned in diametrically opposed relation on the periphery of the drum of the recorder 21. The detecting element 13 is located in the focal plane of the optical system (not shown) for the scanning head 11, and can be either a photoconductive element or a bolometer, as desired. Of course, the scan rate would be subject to the time constant of the element used. Signals generated by the detecting element 13 in response to the presence of a radiating body in the object field of the scanning head 11 are amplified to an adequate level by the detector amplifier 27 and recorded on the drum of the recorder 21 at the recording head 23. At the same time, the signals are fed to the comparison amplifier 29 and are compared to the signals which were recorded on the drum of the recorder 21 at the same corresponding point of the previous scanning cycle and which are sensed by the pick-up head 25. In the event there is a significant difference in level between the signals, as would result when the detecting element 13 generates a signal in response to the radiations from the intrusion of a radiating body into the object field of the scanning head 11, a pulse is delivered to the recording stylus 31 and a dot is applied to the recording strip 33. Stylus 31 is mechanically linked to scanning head 11 so as to indicate the angular position of the scanning head 11 with respect to the object field at the instant at which the signals from the intruding body are sensed. Recording strip 33 is advanced at a predetermined rate by means of a motor 35 to correlate time with the time scale indicated by the transverse lines forming the chart of the recording strip 33. It is thus possible to view the recording strip 33 and to determine at a glance the location and time at which the radiating body intruded into the field of the scanning head 11 and to also note the movement of the intruding body through the field of the scanning head. In the event that an intruding body enters the field of the scanning head 11 and thereafter remains fixed in position, the intrusion detecting system of the present invention will record the entrance of the intruding body into the field but will thereafter fail to indicate its presence, unless some movement of the intruding body occurs, because the signals from the current scanning cycle will be the same as the signals recorded during the preceding cycle and no difference in level will occur.

While only one embodiment of the present invention has been described, many modifications and variations are possible and will become readily apparent to those skilled in the art from the foregoing description which is intended, therefore to be illustrative only and the scope of the invention is defined in the appended claim.

Having now particularly described my invention, what I desire to secure by Letters Patent of the United States and what I claim is:

An intrusion detecting system comprising means for sensing infrared radiation and generating an electric signal in response thereto, drive means for oscillating said sensing means to cyclically scan an object field, means for amplifying said electrical signals generated by said sensing means in response to the sensed radiation, a magnetic recording drum rotatably driven in synchronism with said sensing means by said drive means and at an angular velocity providing one complete revolution thereof during each two complete scanning cycles of said sensing means, a recording head and a pick-up head positioned with respect to said magnetic drum such that at any given instant the signal recorded during the preceding cycle and being derived by said pick-up head corresponds to the signal from the identical point in the current scanning cycle being applied by said recording head to said magnetic drum, means for applying said amplified electrical signals to said recording head for recording on said magnetic drum, means for comparing the level of a recorded signal with the amplified signal generated by said sensing means at the identical corresponding point in a different cycle of scan, means for applying the current amplified signals from said sensing means and the recorded signals derived from said magnetic drum by said pick-up head to said comparing means; a recording stylus, shaft means interconnecting said stylus and said sensing means for oscillatively moving said stylus simultaneously and in synchronism with the oscillatory movement imparted to said sensing means by said drive means, a recording strip, means for advancing said strip past said recording stylus, and means for actuating said stylus when a significant difference in level exists between the current and recorded signals thereby marking said strip and indicating the position of a body intruding in said object field.

References Cited in the file of this patent

UNITED STATES PATENTS

| | | |
|---|---|---|
| 2,410,424 | Brown | Nov. 5, 1946 |
| 2,411,494 | Bliss | Nov. 19, 1946 |
| 2,434,531 | Wilson | Jan. 13, 1948 |
| 2,493,543 | Merchant | Jan. 3, 1950 |
| 2,516,389 | Hurvitz | July 25, 1950 |